Dec. 13, 1955    C. E. MURCOTT    2,726,875
COLLAPSIBLE GOLF CLUB CARRYING CART
Filed Jan. 3, 1951    2 Sheets-Sheet 1
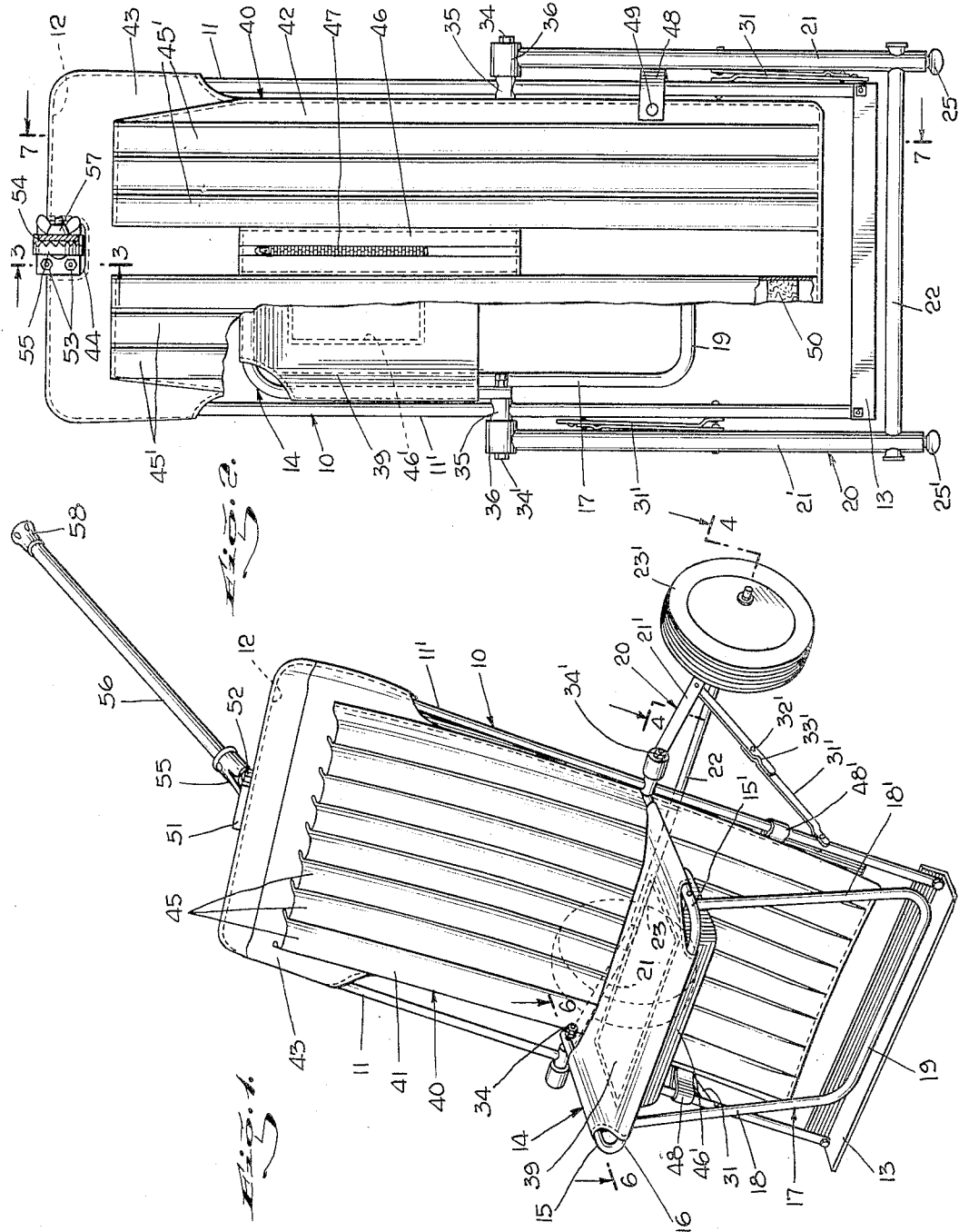
INVENTOR
CHARLES E. MURCOTT
BY
*Howard Thompson*
ATTORNEY

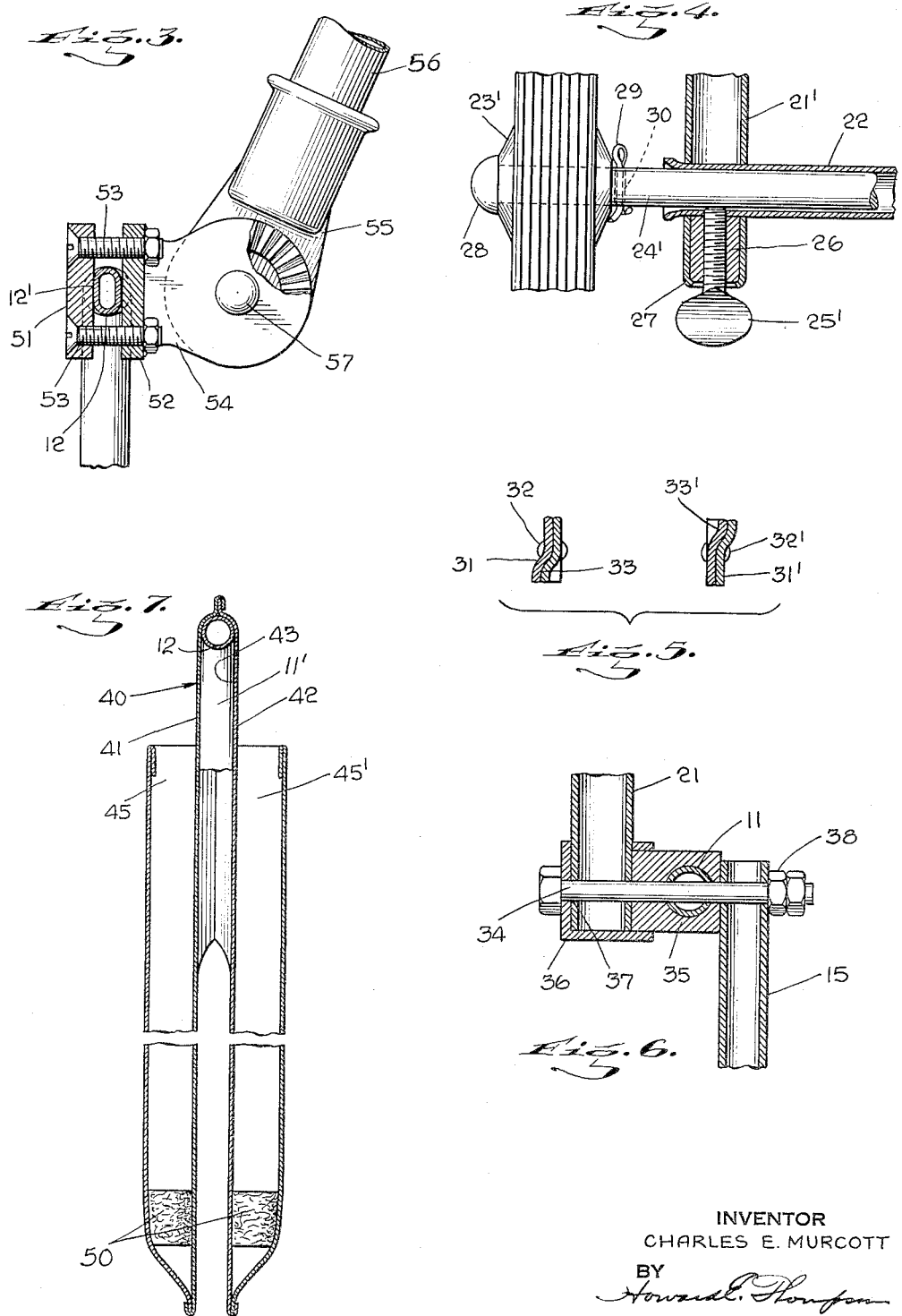

United States Patent Office 2,726,875
Patented Dec. 13, 1955

2,726,875

COLLAPSIBLE GOLF CLUB CARRYING CART

Charles E. Murcott, Valley Stream, N. Y.

Application January 3, 1951, Serial No. 204,124

14 Claims. (Cl. 280—41)

This invention relates to carts for use in carrying golf clubs on the golf course in the operation of playing the game of golf. More particularly, the invention deals with a collapsible and knockdown cart of this type and kind which can be conveniently packed for shipment and storage and, more particularly, the invention deals with a cart of the character described having a main U-shaped frame with a double-faced fabric pocket member detachably mounted on the frame and having pockets for receiving and supporting a complete set of golf clubs, with the clubs disposed on both sides of the frame. Still more particularly, the invention deals with a cart of the character described, having a foldable seat member adapted to be used by the player and, in which, the clubs supported on the main frame form a backing for the seat member.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a perspective view of a cart made according to my invention in extended position for use.

Figure 2 is a rear view of the cart showing some of the parts in collapsed position, with parts of the construction broken away and in section.

Fig. 3 is a partial section on the line 3—3 of Fig. 2.

Fig. 4 is a partial section on the line 4—4 of Fig. 1.

Fig. 5 is a sectional view taken through the check members or stops of a pair of brace links which I employ.

Fig. 6 is a partial section on the line 6—6 of Fig. 1 on an enlarged scale; and

Fig. 7 is a broken section on the line 7—7 of Fig. 2.

My improved golf club carrying cart comprises a main frame 10, which is inverted U-shaped in form and comprises common side members 11, 11' and a top crosshead 12. The lower ends of the side members 11, 11' are joined and reinforced in a foot member, comprising an angle iron strip 13. At 14 is shown another U-shaped seat frame comprising common side members 15, 15' and a front crosshead 16. Pivotally supported in the forward end of the seat frame 14 on the side members 15, 15' is a seat supporting U-shaped frame 17 having common side members 18, 18' pivoted to the side members 15, 15' and a bottom crosshead 19 which is adapted to bear in the channel of the angleiron strip 13 in support of the seat member in operative position. The brace frame 17 collapses within the frame 14, when the parts are in collapsed position.

I also employ a collapsible wheel supporting frame 20 which comprises a pair of common side members 21, 21', to the lower ends of which are secured a tubular cross-shaft or axle 22. At 23, 23' I have shown a pair of common and, preferably, rubber tired wheels. At 24', I have shown one of two similar wheel supporting shafts, which telescope in the axle 22 and are adjustably fixed in the axle by winged set screws 25, 25', note Figs. 2 and 4. The set screws operate in bushings, one of which is shown at 26, the bushings being supported in the lower ends of the tubular members 21, 21', as clearly seen in Fig. 4, by peening-over the end of the members 21, 21', as seen at 27. In this connection, it might be well to bring out that it is preferred that all of the frame members be composed of light metal, such for example, as aluminum and, for this reason, bushings, as at 26, of more substantial material are used to provide a strong thread for the set screws 25, 25'.

Each wheel supporting shaft has, at its outer end, an enlarged head or flange 28 which limits outward movement of the wheels 23, 23' on said shafts and inward movement is fixed by cotter pins 29, which pass through apertures 30 in the shafts. With this construction, the wheels 23, 23' can be readily detached from the shafts for shipment and/or storage, it being understood that the shafts are detachable with respect to the axle 22.

The wheel supporting frame 20 is braced in its extended or operative position, as seen in Fig. 1, by two pairs of hinged links 31, 31'. These links are pivoted to the members 11, 21, 11', 21' and to each other, as indicated at 32, 32'. One pair of links have offset stops at the lower ends thereof, as indicated at 33; whereas, similar stops are provided at the upper edges of the other links 32', as indicated at 33', note Fig. 5. In other words, in collapsing the cart, one pair of links 31 will break downwardly; whereas, the other pair of links 31' will break upwardly. This prevents accidental collapsing of the cart when in use.

The free ends of the side members 15, 15' of the seat frame 14 and the upper ends of the members 21, 21' of the wheel frame 20 operate on common pivot rods or bolts 34, 34' on the side members 11, 11' of the frame, note Fig. 6. As both pivotal mountings on the common pivots 34, 34' are the same, the brief description of one will apply to the other. Fixed to the side members 11, 11' are pivot sleeves 35, on which cap-shaped sleeves 36 are rotatably mounted. The members 21, 21' extend into the sleeves 36 and are apertured to receive the pivot bolts 34, 34', as seen at 37. The sleeves 35 abut the members 21, 21', as will be apparent. The members 15, 15' of the frame 14 are supported on the inner ends of the bolts 34, 34' and pairs of nuts 38 are employed to lock the pivot bolts 34, 34' in position. The securing is such as to provide a free frictional movement of the seat frame on the pivots and corresponding movement of the wheel supporting frame on said pivots.

The seat frame 14 includes a canvas or other fabric facing 39, which is secured to the side members 15, 15' and the crosshead 16 thereof, as will clearly appear in Fig. 1, the corners being left open for free movement of the pivot ends of the brace frame 17 on the seat frame.

At 40 I have shown a club supporting unit in the form of front and rear facings 41 and 42 joined at the upper ends in a pocket portion 43, which fits over the top crosshead 12 of the main frame 10 and extends downwardly onto the sides 11, 11', as clearly seen in Fig. 1 of the drawing. Also note, in this connection, Fig. 7.

The pocket portion has, on the surface 42, centrally of the top thereof, an opening 44 for purposes later described. The front member or panel 41 has a series of vertically arranged pockets 45 spaced transversely thereof, eight pockets being shown in the present construction; whereas, the rear facing or member 42 has two sets or groups of vertically arranged pockets 45', three pockets being disposed in each group, thus providing support for a standard fourteen club set of golf clubs.

The rear member 42 has vertically arranged thereon intermediate the pairs of pockets 45' a vertically elongated accessory pocket 46, the opening of which is preferably controlled by a separable slide fastener 47. The pocket 46 can be utilized for the storage of golf balls. Another separable slide fastener controlled pocket 46' is fixed to the lower portion of the seat 39 and is sufficiently large for the storage of a sweater, jacket or similar accessory. Fixed to the front member 41 of the unit 40, adjacent the lower end thereof, are a pair of straps 48, 48' having, at their ends, snap fasteners or the like, one of which is seen at 49 in Fig. 2 of the drawing to engage a corresponding fastener part on the member 42 in retaining the unit 40 in position on the frame 10 and also facilitating detachable mounting of the unit, as will be apparent.

I also preferably employ at the lower end of each of the pockets 45, 45' cushion pads 50 of felt or similar material to cushion the clubs as they are moved downwardly in the respective pockets. It will be understood that the iron clubs of a golf set are supported in the pockets 45 and one or more of such clubs can also be supported in pockets 45'; whereas, the wood clubs are supported in the other pockets 45' and the number of these will depend upon the type of set which is used by the player.

Secured centrally of the crosshead 12 of the main frame is a rearwardly extending bracket, comprising two plates 51, 52 securely clamped in predetermined position by four bolts 53, so as to be immovable on the crosshead 12, the crosshead being recessed, as indicated at 12', note Fig. 3, to key the plates thereon. The plate 52 includes an extended tooth plate 54, in conjunction with which a corresponding tooth head 55 on a handle member 56 operates and a winged nut bolt 57 is employed to clamp the handle member 56 in different positions of adjustment. It will be understood that the tooth arrangement on the parts 54, 55 are circumferential around the winged nut bolt 57, as indicated in Fig. 3. In this manner, the handle member 56 can be adjusted to the desired angular extension, when the cart is in use, this extension being normally upward, when the cart is resting on the ground and assumes more or less of a horizontal position when the cart is drawn over the ground, in which latter position, the lower end of the main frame 10, or the angleiron 13, is in raised position with respect to the ground. The handle member 56 has, at its end, a rubber or other hand-grip 58. It will be understood that, when the cart is in collapsed position, the handle member 56 is swung downwardly into substantially parallel relationship with respect to the frame 10.

In the collapsed position of the parts, as indicated in Fig. 2 of the drawing, it will appear that the leg frame 20 is lowermost, that is to say, the lower end of the main frame 10 is disposed within the wheel frame. The seat frame 14 is disposed within the main frame 10 and the brace frame 17 is arranged substantially in alinement with the frame 14. The links 31, 31' collapse within and between the frames 10 and 20. It will be, thus, seen that a relatively narrow overall position is attained of the complete collapsed unit. In storage and shipment, the wheel shafts can be arranged in the pocket 46 and the wheels 23, 23' can be placed upon the rear surface of the complete collapsed cart.

Another distinctive feature of my cart construction resides in the fact that the wheel shafts provide a widespread mounting of the wheels on the cart with respect to side members 11, 11' of the frame, so as to make the cart very sturdy in support of the clubs and avoid any possibility of tilting thereof. On the other hand, by simply loosening the set screws 25, 25', the wheels 23, 23' can be brought into close proximity with the side members 21, 21' when the cart is to be quickly stored away, or placed in an automobile or rear compartment of an automobile. On the other hand, the wheels can be quickly detached by simply loosening the screws 25, 25' and pulling the wheels with their shafts out from the axle 22.

Whenever desired, the complete unit 40, with the clubs thereon, can be detached from the frame 10 by simply opening the straps 48, 48' and pulling the unit 20 over the handle member 56, the opening 44 in the unit being sufficiently large to facilitate this operation. In this way, the unit 40 can be removed to carry the clubs separately for package and storage and further can be removed for cleaning or other purposes.

It will be understood that the straps 48, 48', in addition to detachably supporting the unit 40, also maintain the clubs or the club shafts substantially in the environment of the main frame 10.

Having fully described my invention, what I claim as new and desire to secure by Letters Patent is:

1. A golf club carrying cart, comprising a main frame having a top crosshead and depending sides, an angleiron joining the lower ends of the sides of said frame, a U-shaped wheel frame having parallel sides, the upper ends of said sides being pivotally coupled to outer surfaces of the sides of the main frame and carrying, at its lower end, a transverse axle portion, means comprising pairs of links for coupling and bracing sides of the wheel frame with the sides of the main frame, a pair of wheels having shaft portions, means detachably and adjustably coupling the shaft portions of said wheels with said axle portion in numerous positions, a club supporting unit detachable with respect to the main frame, said unit comprising a pair of pocketed facings joined throughout the length of their upper ends in a pocket portion, in which the upper end of the main frame is adapted to be arranged in support of the pocketed facings at the front and rear of the main frame, and means on said unit engaging side members of the main frame for retaining the unit on the main frame and in predetermined position with respect thereto.

2. A golf club carrying cart, comprising a main frame having a top crosshead and depending sides, an angleiron joining the lower ends of the sides of said frame, a U-shaped wheel frame having parallel sides, the upper ends of said sides being pivotally coupled to outer surfaces of the sides of the main frame and carrying, at its lower end, a transverse axle portion, means comprising pairs of links for coupling and bracing sides of the wheel frame with the sides of the main frame, a pair of wheels having shaft portions, means detachably and adjustably coupling the shaft portions of said wheels with said axle portion in numerous positions, a club supporting unit detachable with respect to the main frame, said unit comprising a pair of pocketed facings joined throughout the length of their upper ends in a pocket portion, in which the upper end of the main frame is adapted to be arranged in support of the pocketed facings at the front and rear of the main frame, means on said unit engaging side members of the main frame for retaining the unit on the main frame and in predetermined position with respect thereto, the rear facing of said unit including an elongated pocket having a separable fastener closure, and a handle member adjustably coupled with the upper crosshead of said main frame.

3. A golf club carrying cart, comprising a main frame having a top crosshead and depending sides, an angleiron joining the lower ends of the sides of said frame, a U-shaped wheel frame having parallel sides the upper ends of said sides being pivotally coupled to outer surfaces of the sides of the main frame and carrying, at its lower end, a transverse axle portion, means comprising pairs of links for coupling and bracing sides of the wheel frame with the sides of the main frame, a pair of wheels having shaft portions, means detachably and adjustably coupling the shaft portions of said wheels with said axle portion in numerous positions, a club supporting unit detachable with respect to the main frame, said unit comprising a pair of pocketed facings joined throughout the length of their upper ends in a pocket portion, in which the upper end of the main frame is adapted to be arranged in support of the pocketed facings at the front and rear of the main frame, means on said unit engaging side members of the main frame for retaining the unit on the main frame and in predetermined position with respect thereto, the rear facing of said unit including an elongated pocket having a separable fastener closure, a handle member adjustably coupled with the upper crosshead of said main frame, and said unit having an opening facilitating detachment of the unit over the handle member of said frame.

4. A golf club carrying cart, comprising a main frame having a top crosshead and depending sides, an angleiron joining the lower ends of the sides of said frame, a U-shaped wheel frame having parallel sides, the upper ends of said sides being pivotally coupled to outer surfaces of the sides of the main frame and carrying, at its lower end, a transverse axle portion, means comprising pairs of links for coupling and bracing sides of the wheel frames with the sides of the main frame, a pair of wheels having shaft portions, means detachably and adjustably coupling the shaft portions of said wheels with said axle portion in numerous positions, a club supporting unit detachable with respect to the main frame, said unit comprising a pair of pocketed facings joined throughout the length of their upper ends in a pocket portion, in which the upper end of the main frame is adapted to be arranged in support of the pocketed facings at the front and rear of the main frame, means on said unit engaging side members of the main frame for retaining the unit on the main frame and in predetermined position with respect thereto, the rear facing of said unit including an elongated pocket having a separable fastener closure, a handle member adjustably coupled with the upper crosshead of said main frame, said unit having an opening facilitating detachment of the unit over the handle member of said frame, and a seat frame pivotally coupled with the main frame on pivots common to the pivots of the wheel frame with said main frame.

5. A golf club carrying cart, comprising a main frame having a top crosshead and depending sides, an angleiron joining the lower ends of the sides of said frame, a U-shaped wheel frame having parallel sides, the upper ends of said sides being pivotally coupled to outer surfaces of the sides of the main frame and carrying, at its lower end, a transverse axle portion, means comprising pairs of links for coupling and bracing sides of the wheel frame with the sides of the main frame, a pair of wheels having shaft portions, means detachably and adjustably coupling the shaft portions of said wheels with said axle portion in numerous positions, a club supporting unit detachable with respect to the main frame, said unit comprising a pair of pocketed facings joined throughout the length of their upper ends in a pocket portion, in which the upper end of the main frame is adapted to be arranged in support of the pocketed facings at the front and rear of the main frame, means on said unit engaging side members of the main frame for retaining the unit on the main frame and in predetermined position with respect thereto, the rear facing of said unit including an elongated pocket having a separable fastener closure, a handle member adjustably coupled with the upper crosshead of said main frame, said unit having an opening facilitating detachment of the unit over the handle member of said frame, a seat frame pivotally coupled with the main frame on pivots common to the pivots of the wheel frame with said main frame, and means movably coupled with the seat frame for bracing the seat frame on the angleiron of said main frame.

6. A golf club carrying cart, comprising a main frame having a top crosshead and depending sides, an angleiron joining the lower ends of the sides of said frame, a U-shaped wheel frame having parallel sides, the upper ends of said sides being pivotally coupled to outer surfaces of the sides of the main frame and carrying, at its lower end, a transverse axle portion, means comprising pairs of links for coupling and bracing sides of the wheel frame with the sides of the main frame, a pair of wheels having shaft portions, means detachably and adjustably coupling the shaft portions of said wheels with said axle portion in numerous positions, a club supporting unit detachable with respect to the main frame, said unit comprising a pair of pocketed facings joined throughout the length of their upper ends in a pocket portion, in which the upper end of the main frame is adapted to be arranged in support of the pocketed facings at the front and rear of the main frame, means on said unit engaging side members of the main frame for retaining the unit on the main frame and in predetermined position with respect thereto, the rear facing of said unit including an elongated pocket having a separable fastener closure, a handle member adjustably coupled with the upper crosshead of said main frame, said unit having an opening facilitating detachment of the unit over the handle member of said frame, a seat frame pivotally coupled with the main frame on pivots common to the pivots of the wheel frame with said main frame, means movably coupled with the seat frame for bracing the seat frame on the angleiron of said main frame, said last named means comprising a U-shaped frame pivoted to the seat frame, said seat frame having a fabric facing, and a pocket on the lower surface of said facing.

7. A wheeled vehicle of the class described, comprising a main frame defined by side members, a top crosshead and a foot member, the foot member joining the lower ends of the side members, a seat frame arranged within the main frame, a wheel supporting frame arranged outwardly of the main frame, means comprising common pivots on the side members of the main frame for pivotally supporting the seat frame and wheel frame on the main frame, means movably coupled with the seat frame for bracing the seat frame on said foot member, and means comprising pairs of links breaking in opposed directions for bracing the wheel frame on the main frame in extended position.

8. A wheeled vehicle of the class described, comprising a main frame defined by side members, a top crosshead and a foot member, the foot member joining the lower ends of the side members, a seat frame arranged within the main frame, a wheel supporting frame arranged outwardly of the main frame, means comprising common pivots on the side members of the main frame for pivotally supporting the seat frame and wheel frame on the main frame, means movably coupled with the seat frame for bracing the seat frame on said foot member, means comprising pairs of links breaking in opposed directions for bracing the wheel frame on the main frame in extended position, said wheel frame having, at its lower end, a tubular axle, shafts adapted to be mounted in the ends of said axle, means for detachably mounting wheels at one end portion of said shafts, and means on the main frame for adjustably clamping the shafts in several different positions in said axle.

9. In a cart of the character described, an elongated rectangular frame, wheels for supporting said frame for free movement over a surface, a handle member adjustably mounted on the frame for pulling the cart over a surface on said wheels while raising the frame of said cart with respect to said surface, a golf club supporting unit on said frame and comprising two fabric facings united throughout the length of their upper ends and at the sides adjacent the upper ends to form a pocket engaging and enveloping the upper end portion of said frame with one facing disposed at the front of the frame and the other facing at the rear thereof, the top of the rear facing having an opening to receive said handle member, and each of said facings having a plurality of club receiving and supporting pockets spaced thereon.

10. In a cart of the character described, an elongated rectangular frame, wheels for supporting said frame for free movement over a surface, a handle member adjustably mounted on the frame for pulling the cart over a surface on said wheels while raising the frame of said cart with respect to said surface, a golf club supporting unit on said frame and comprising two fabric facings united throughout the length of their upper ends and at the sides adjacent the upper ends to form a pocket engaging and enveloping the upper end portion of said frame with one facing disposed at the front of the frame and the other facing at the rear thereof, the top of the rear facing having an opening to receive said handle member, each of said facings having a plurality of club receiving and supporting pockets spaced thereon, at least one of the facings having a utility pocket controlled by a separable fastener, and means detachably supporting said unit on the frame.

11. In a cart of the character described, an elongated rectangular frame, wheels for supporting said frame for free movement over a surface, a handle member adjustably mounted on the frame for pulling the cart over a surface on said wheels while raising the frame of said cart with respect to said surface, a golf club supporting unit on said frame and comprising two fabric facings united throughout the length of their upper ends in a pocket engaging the upper end of said frame with one facing disposed at the front of the frame and the other facing at the rear thereof, each of said facings having a plurality of club receiving and supporting pockets spaced thereon, at least one of the facings having a utility pocket controlled by a separable fastener, means detachably supporting said unit on the frame, and said frame including a two-part seat unit normally collapsible within said frame and adapted to be extended into operative position.

12. A collapsible golf carrying cart, comprising a main frame having a top crosshead and depending sides, an angleiron joining the lower ends of the sides of said frame, a U-shaped wheel frame having parallel sides, the upper ends of said sides being pivotally coupled to outer surfaces of the sides of the main frame and carrying, at its lower end, a transverse tubular axle portion, the sides of the wheel frame being sufficiently long to dispose the tubular axle portion below and in alinement with said angleiron of the main frame in the collapsed position of said frames to maintain alinement of the frames one with respect to the other, means comprising a pair of links for coupling and bracing sides of the wheel frame with the sides of the main frame, a pair of wheels having shaft portions, and means detachably and adjustably coupling the shaft portions of said wheels with said axle portion in numerous positions.

13. A golf club supporting unit for carts of the character described having a frame with a handle member extending therefrom, said unit comprising a pair of fabric facings, means joining the entire upper ends thereof to form a pocket between said facings at the upper portions thereof adapted to receive the upper portion of said frame, said pocket being permanently closed at the top and sides thereof and opening downwardly between said facings, one facing of said unit having, in the upper pocket part thereof, an opening to receive said handle member and each facing having a plurality of club receiving and supporting pockets arranged vertically thereon and opening through the upper end of said unit.

14. A golf club supporting unit for carts of the character described having a frame with a handle member extending therefrom, said unit comprising a pair of fabric facings, means joining the entire upper ends thereof to form a pocket between said facings at the upper portions thereof adapted to receive the upper portion of said frame, said pocket being permanently closed at the top and sides thereof and opening downwardly between said facings, one facing of said unit having, in the upper pocket part thereof, an opening to receive said handle member each facing having a plurality of club receiving and supporting pockets arranged vertically thereon and opening through the upper end of said unit, the club supporting pockets of one facing being divided into two groups, an accessory pocket disposed between said groups, and said accessory pocket having a separable closure.

References Cited in the file of this patent

UNITED STATES PATENTS

| | | |
|---|---|---|
| 299,609 | Wood | June 3, 1884 |
| 1,485,067 | Bristol | Feb. 26, 1924 |
| 2,010,166 | Thompson | Aug. 6, 1935 |
| 2,047,079 | MacMurray | July 7, 1936 |
| 2,368,752 | Duis | Feb. 6, 1945 |
| 2,393,020 | Brede | Jan. 15, 1946 |
| 2,435,893 | Mall | Feb. 10, 1948 |
| 2,438,078 | Sutphen | Mar. 16, 1948 |
| 2,442,620 | Simpson | June 1, 1948 |
| 2,449,910 | Quiring | Sept. 21, 1948 |
| 2,513,020 | Haney | June 27, 1950 |
| 2,546,416 | Alter | Mar. 27, 1951 |
| 2,556,814 | Love | June 12, 1951 |
| 2,577,579 | Hall | Dec. 4, 1951 |